(12) United States Patent
Pettit et al.

(10) Patent No.: US 8,885,878 B2
(45) Date of Patent: Nov. 11, 2014

(54) INTERACTIVE SECRET SHARING

(75) Inventors: Bradley Robert Pettit, Los Gatos, CA (US); Eric Soldan, Saratoga, CA (US); Relja Markovic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 13/189,392

(22) Filed: Jul. 22, 2011

(65) Prior Publication Data

US 2013/0022235 A1 Jan. 24, 2013

(51) Int. Cl.
- *G06K 9/00* (2006.01)
- *G09G 5/00* (2006.01)
- *A63F 13/30* (2014.01)
- *G06F 21/36* (2013.01)
- *G06F 3/03* (2006.01)
- *G06F 3/01* (2006.01)
- *G06F 3/0346* (2013.01)

(52) U.S. Cl.
CPC ........... *A63F 13/12* (2013.01); *A63F 2300/201* (2013.01); *G06F 21/36* (2013.01); *A63F 2300/401* (2013.01); *G06F 3/0304* (2013.01); *G06F 3/017* (2013.01); *A63F 2300/6607* (2013.01); *A63F 2300/695* (2013.01); *G06F 3/0346* (2013.01); *A63F 2300/1093* (2013.01)
USPC ........... 382/103; 382/107; 382/154; 348/143; 345/156

(58) Field of Classification Search
CPC ..... G06F 3/011; G06F 3/017; G06F 3/04815; G06F 2203/04808; G06F 3/033; G06F 3/0346; G06F 3/0488; A61B 19/5244; G01C 21/36
See application file for complete search history.

(56) References Cited

U.S. PATENT DOCUMENTS

| | | | |
|---|---|---|---|
| 6,330,356 B1 * | 12/2001 | Sundareswaran et al. | 382/154 |
| 6,980,690 B1 * | 12/2005 | Taylor et al. | 382/154 |
| 6,993,157 B1 * | 1/2006 | Oue et al. | 382/103 |
| 7,036,094 B1 * | 4/2006 | Cohen et al. | 715/863 |
| 7,224,830 B2 * | 5/2007 | Nefian et al. | 382/154 |
| 7,340,077 B2 * | 3/2008 | Gokturk et al. | 382/103 |
| 7,474,767 B2 * | 1/2009 | Sen et al. | 382/107 |
| 7,773,796 B2 * | 8/2010 | Bledsoe et al. | 382/141 |
| 7,881,295 B2 | 2/2011 | Fry | |
| 7,971,156 B2 * | 6/2011 | Albertson et al. | 715/863 |
| 8,451,333 B2 * | 5/2013 | Sandler et al. | 348/169 |
| 8,588,464 B2 * | 11/2013 | Albertson et al. | 382/103 |
| 2003/0028784 A1 | 2/2003 | Uchida | |

(Continued)

OTHER PUBLICATIONS

Mayrhofer, et al., "Shake Well Before Use: Intuitive and Secure Pairing of Mobile Devices", Retrieved at <<http://www.mayrhofer.eu.org/downloads/publications/IEEE-TransMobComp-Shaking-final.pdf>>, IEEE Transactions on Mobile Computing, vol. 8, No. 6, Jun. 2009, pp. 792-806.

(Continued)

*Primary Examiner* — Manav Seth
(74) *Attorney, Agent, or Firm* — Aaron Chatterjee; Peter Taylor; Micky Minhas (57) ABSTRACT

Interactive secret sharing includes receiving video data from a source and interpreting the video data to track an observed path of a device. In addition, position information is received from the device, and the position information is interpreted to track a self-reported path of the device. If the observed path is within a threshold tolerance of the self-reported path, access is provided to a restricted resource.

9 Claims, 6 Drawing Sheets

(56) References Cited

U.S. PATENT DOCUMENTS

| | | | |
|---|---|---|---|
| 2003/0113018 A1* | 6/2003 | Nefian et al. | 382/181 |
| 2003/0156756 A1* | 8/2003 | Gokturk et al. | 382/190 |
| 2004/0161132 A1* | 8/2004 | Cohen et al. | 382/103 |
| 2005/0052406 A1* | 3/2005 | Stephanick et al. | 345/156 |
| 2005/0210419 A1* | 9/2005 | Kela et al. | 715/863 |
| 2006/0256074 A1 | 11/2006 | Krum et al. | |
| 2007/0041058 A1* | 2/2007 | Disatnik et al. | 358/486 |
| 2008/0244752 A1 | 10/2008 | Gudan et al. | |
| 2009/0265470 A1 | 10/2009 | Shen et al. | |
| 2010/0278345 A1 | 11/2010 | Alsina et al. | |
| 2010/0306713 A1* | 12/2010 | Geisner et al. | 715/863 |
| 2011/0212770 A1* | 9/2011 | Ocko et al. | 463/29 |
| 2012/0119987 A1* | 5/2012 | Im et al. | 345/156 |

OTHER PUBLICATIONS

Chong, et al., "Exploring the Use of Discrete Gestures for Authentication", Retrieved at <<http://pubs.cs.uct.ac.za/archive/00000526/01/57270205.pdf>>, Human-Computer Interaction—INTERACT 2009, 12th IFIP TC 13 International Conference, Aug. 24-28, 2009, pp. 205-213.

Patel, et al., "A Gesture-based Authentication Scheme for Untrusted Public Terminals", Retrieved at <<http://citeseerx.ist.psu.edu/viewdoc/download?doi=10.1.1.86.3951&rep=rep1&type=pdf>>, 17th Annual ACM Symposium on User Interface Software and Technology, Oct. 24-27, 2004, pp. 157-160.

* cited by examiner

INTERACTIVE SECRET SHARING

BACKGROUND

Sharing a secret between two entities is often a part of an authentication procedure in granting one or both of the entities access to a restricted resource. Allowing access to the restricted resource may include entering a virtual game room, executing an application, or sharing digital information, for example.

As one example, a user may wish to log on to a gaming system. In order to verify that the user is allowed access, the gaming system may prompt the user to enter a shared secret. The shared secret is typically limited by the capabilities of available input devices. For example, the available input devices (such as a keyboard) may necessitate that the shared secret be an alphanumeric code. As such, the shared secret may be laborious to enter and may not provide an enjoyable user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of the disclosure, interactive secret sharing includes receiving video data from a source and interpreting the video data to track an observed path of a device. In addition, position information is received from the device, and the position information is interpreted to track a self-reported path of the device. If the observed path is within a threshold tolerance of the self-reported path, access is provided to a restricted resource.

DETAILED DESCRIPTION

The present description is related to shared secrets capable of producing a more enjoyable user experience. The present description is further related to recognizing shared secrets via a variety of input devices such as image sensors, touch pads, accelerometers, and gyrometers, which allow the physical movements of the users to serve as aspects of the shared secrets.

Figure 1:
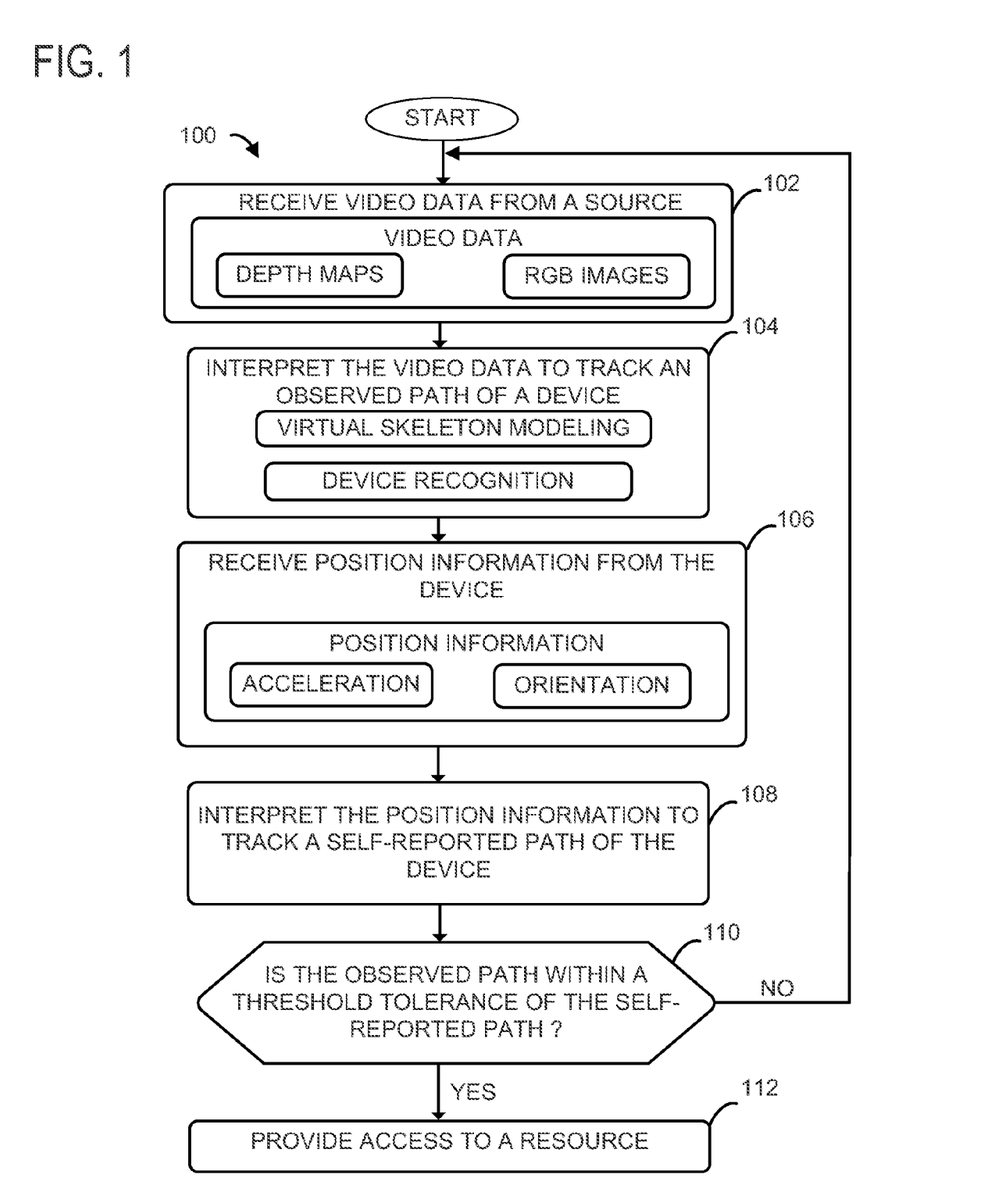
FIG. 1 shows an example method of interactive secret sharing in accordance with an embodiment of the present disclosure.

FIG. 1 shows an embodiment of a method 100 for sharing interactive secrets between two entities. Interactive secrets in accordance with the present disclosure may take the form of virtually anything that can be observed and recorded, such as a dance move, a pattern traced by a person's hand, or a gesture. As explained in more detail with reference to FIG. 6, method 100 may be performed by a computing system, including, but not limited to, an entertainment computing system such as a gaming console, or a mobile computing device.

At 102, the method 100 includes receiving video data from a source. The source may be any suitable device capable of observing a scene and outputting a machine-readable representation of the scene.

In some embodiments, the source may include an RGB image sensor configured to determine a color and/or light intensity value for each of a plurality of pixels imaging the scene. The RGB image sensor, or another type of camera, may be used to generate a conventional digital image for each frame of the scene, and sequential frames may collectively form a video representation of the scene.

In some embodiments, the source may include a depth camera. The depth camera may determine, for each pixel, the three dimensional depth of a surface in the scene relative to the depth camera. Virtually any depth finding technology may be used without departing from the scope of this disclosure. When a depth camera is used, the three dimensional depth information determined for each pixel may be used to generate a depth map. Depth maps may take the form of virtually any suitable data structure, including but not limited to, a matrix of pixels, where each pixel indicates a depth of an object observed at that pixel. The video data may include a sequence of such depth maps.

Figure 2:
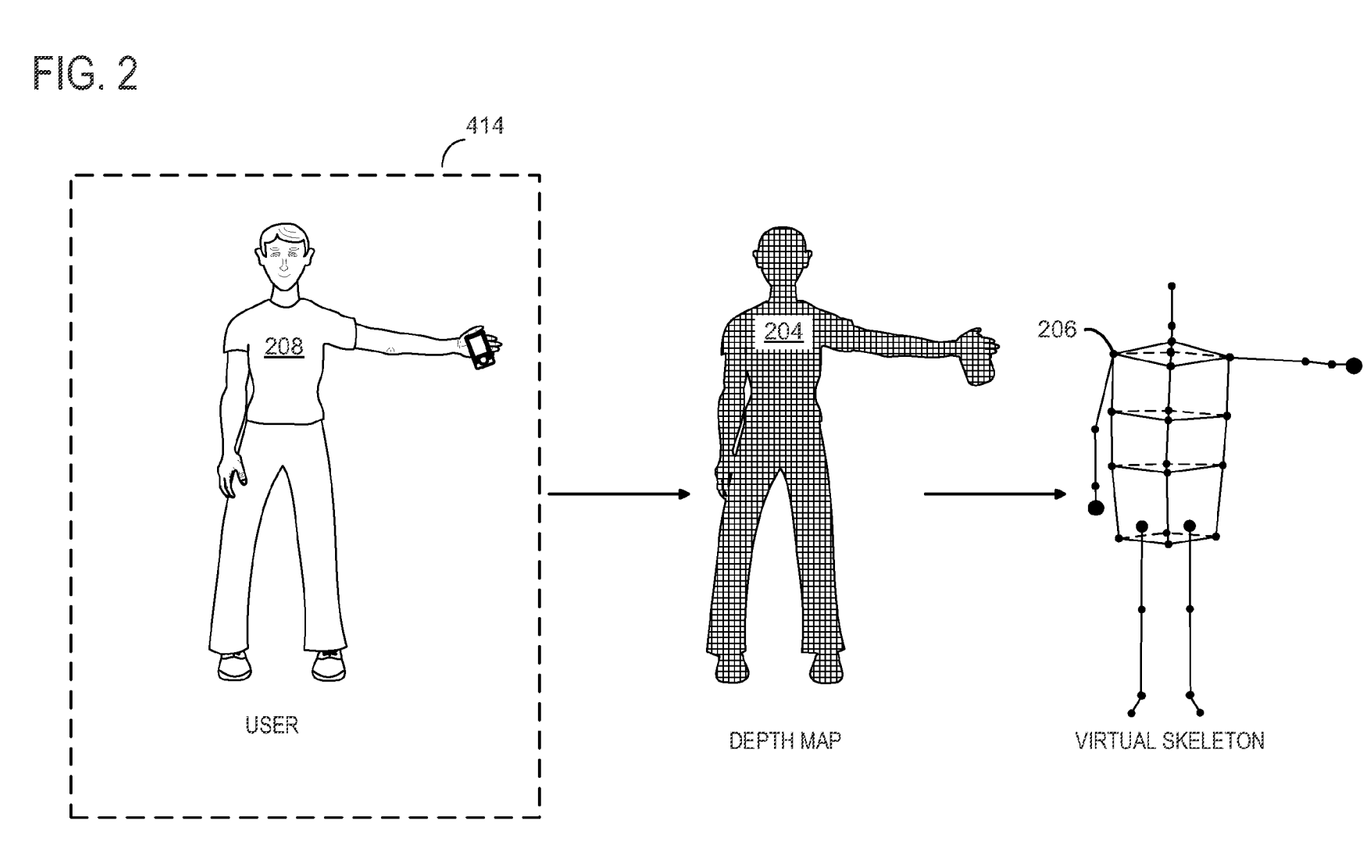
FIG. 2 shows a depth image processing pipeline in accordance with an embodiment of the present disclosure.

Depth maps may be used to model a user as a virtual skeleton. FIG. 2 shows a simplified processing pipeline where a depth camera is used to provide a depth map that is used to model a user 208 as a virtual skeleton 206. It will be appreciated that a processing pipeline may include additional steps and/or alternative steps than those depicted in FIG. 2 without departing from the scope of this disclosure.

As shown in FIG. 2, the three-dimensional appearance of the user 208 and the rest of observed scene 414 may be imaged by a depth camera. In FIG. 2, a depth map 204 is schematically illustrated as a pixilated grid of the silhouette of the user 208. This illustration is for simplicity of understanding, not technical accuracy. It is to be understood that a depth map generally includes depth information for all pixels, not just pixels that image the user 208.

A virtual skeleton 206 may be derived from the depth map 204 to provide a machine-readable representation of the user 208. In other words, the virtual skeleton 206 is derived from depth map 204 to model the user 208. The virtual skeleton 206 may be derived from the depth map 204 in any suitable manner. In some embodiments, one or more skeletal fitting algorithms may be applied to the depth map. The present disclosure is compatible with virtually any skeletal modeling techniques.

The virtual skeleton 206 may include a plurality of joints, and each joint may correspond to a portion of the user 208. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

Turning back to FIG. 1, at 104, the method 100 includes interpreting the video data to track an observed path of a device. The device, such as a mobile phone, may be held in the hand of a user. The user's motion may be captured in the video data. In some embodiments, data from an RGB sensor is interpreted to track the observed path of the device. Any number of object tracking techniques may be used. As a nonlimiting example, interpreting the video data may include recognizing the device within video images acquired via the source camera, and the position of the device may be tracked from frame to frame. Any suitable object recognition technique may be utilized to identify a device within the video images.

Figure 3:
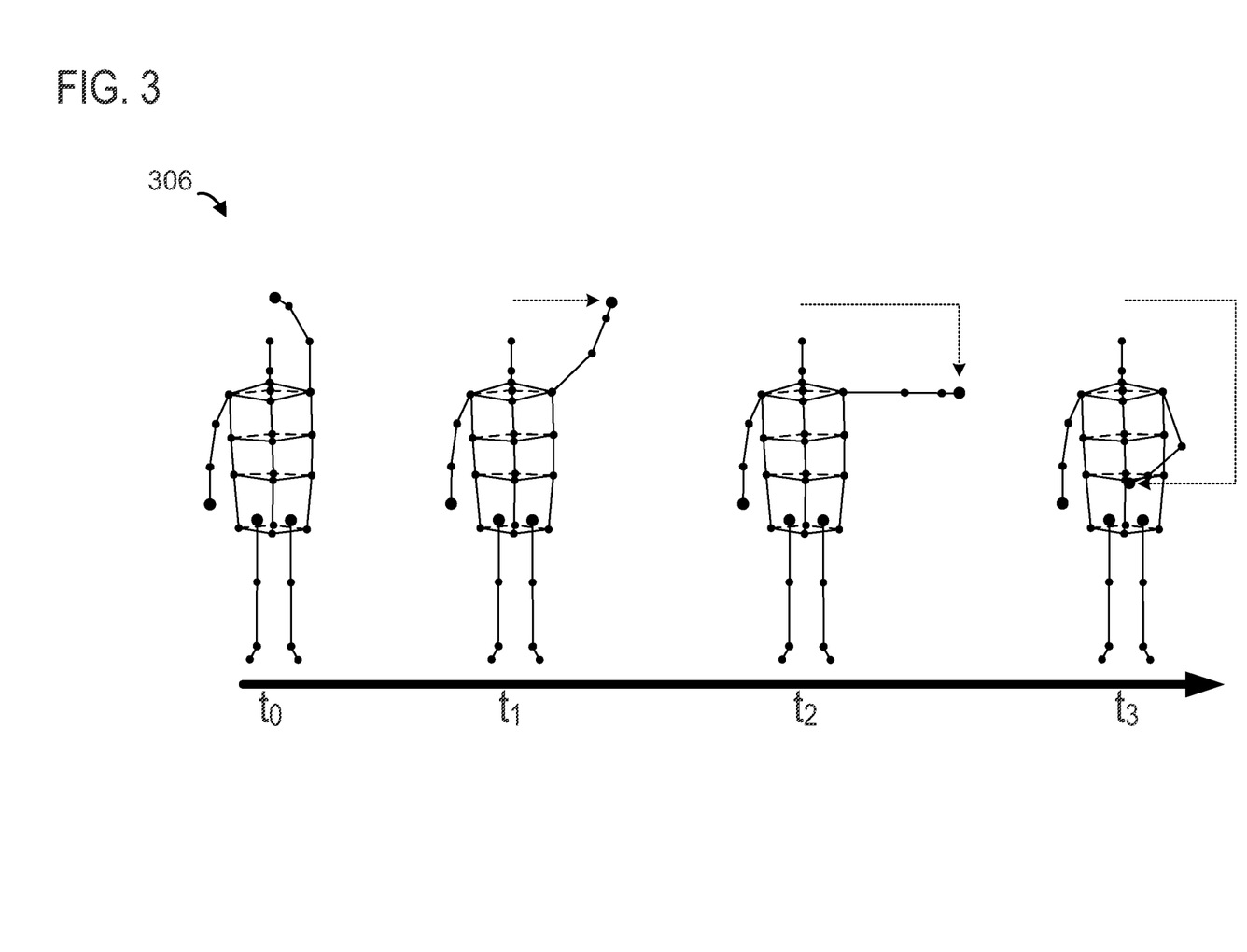
FIG. 3 shows a sequence of virtual skeletons in accordance with depth imaging techniques of the present disclosure.

In some embodiments, interpreting the video data includes modeling a user as a virtual skeleton including a plurality of joints, as discussed above with reference to FIG. 2. Further, tracking the observed path of the device may include tracking an observed path of a hand joint of a virtual skeleton. A sequence of virtual skeletons 306 is illustrated in FIG. 3. To track the device, it may be determined in which hand the user is holding the device. For example, if one hand joint of the virtual skeleton appears stationary, it may be determined that the device is in the other hand. As another example, raw RGB and/or depth video data may be interrogated to determine if a device can be viewed at a position corresponding to a position of a hand joint. In other embodiments, the position of both hand joints may be tracked and analyzed, as described below. By tracking the joint of the hand holding the device, an observed path of the device may be tracked from frame to frame.

In the illustrated embodiment, it may be determined that the device is held in the user's left hand, and thus the position of the device corresponds to the position of the left hand joint of the virtual skeleton. As such, the frame-to-frame movements of the virtual skeleton can be analyzed to determine that the device is moving in a substantially rectangular path.

The above device tracking techniques are meant to be exemplary in nature, and it should be understood that the present disclosure is compatible with virtually any device tracking technique.

Turning back to FIG. 1, at 106, the method 100 includes receiving position information from the device. In other words, the computing system performing method 100 may receive position information from the device that is being observed at 102 (e.g., a mobile device held in the user's hand). The position information may include any information that can be processed to determine the position of the device over time. Acceleration information, orientation information, and/or GPS information may be received from a device that is self-analyzing its position, orientation, and/or movement, for example. The position information may be sent from the device via any suitable communication channel. As nonlimiting examples, wireless communication channels such as IEEE 802.11x or IEEE 802.15.x may be employed, among others.

At 108, the method 100 includes interpreting the position information to track a self-reported path of the device. Any number of techniques may be used. As one example, acceleration information received from the device may be numerically integrated to give velocity, and again integrated to give position. In other embodiments, the device may send position information directly, thus alleviating the need to calculate a position from acceleration information.

At 110, the method 100 includes determining if the observed path is within a threshold tolerance of the self-reported path. In other words, the path that the device self-measures and self-reports is compared to the path that is observed using the source (e.g., RGB camera and/or depth camera). A variety of approaches may be utilized to determine if the paths are within a threshold tolerance of one another. One approach may include representing both the observed path and the self-reported path in a similar data structure, such as an array containing position and time information or a 2D or 3D vector graphic of the device path. The data structures may be compared and processed to identify similarities in position, velocity, and acceleration, among other metrics. Furthermore, one or more comparison algorithms can be utilized to determine if the observed path is within a threshold tolerance of the self-reported path.

If the observed path is within a threshold tolerance of the self-reported path, the method 100 may include, at 112, providing access to a restricted resource. As introduced above, the restricted resource may take a variety of forms without departing from the scope of this disclosure. As nonlimiting examples, providing access to the restricted resource may include providing access to an electronic document such as a song, a photo, a text file, a video, etc., providing access to a virtual game room, executing an application, sharing digital information, or allowing a user to log on to a multimedia console, among others. In some embodiments, access may be directly provided to a local resource. In other embodiments, access may be provided to a remote resource (e.g., by sharing a cryptographic license for accessing remote content from a third party system).

Figure 4:
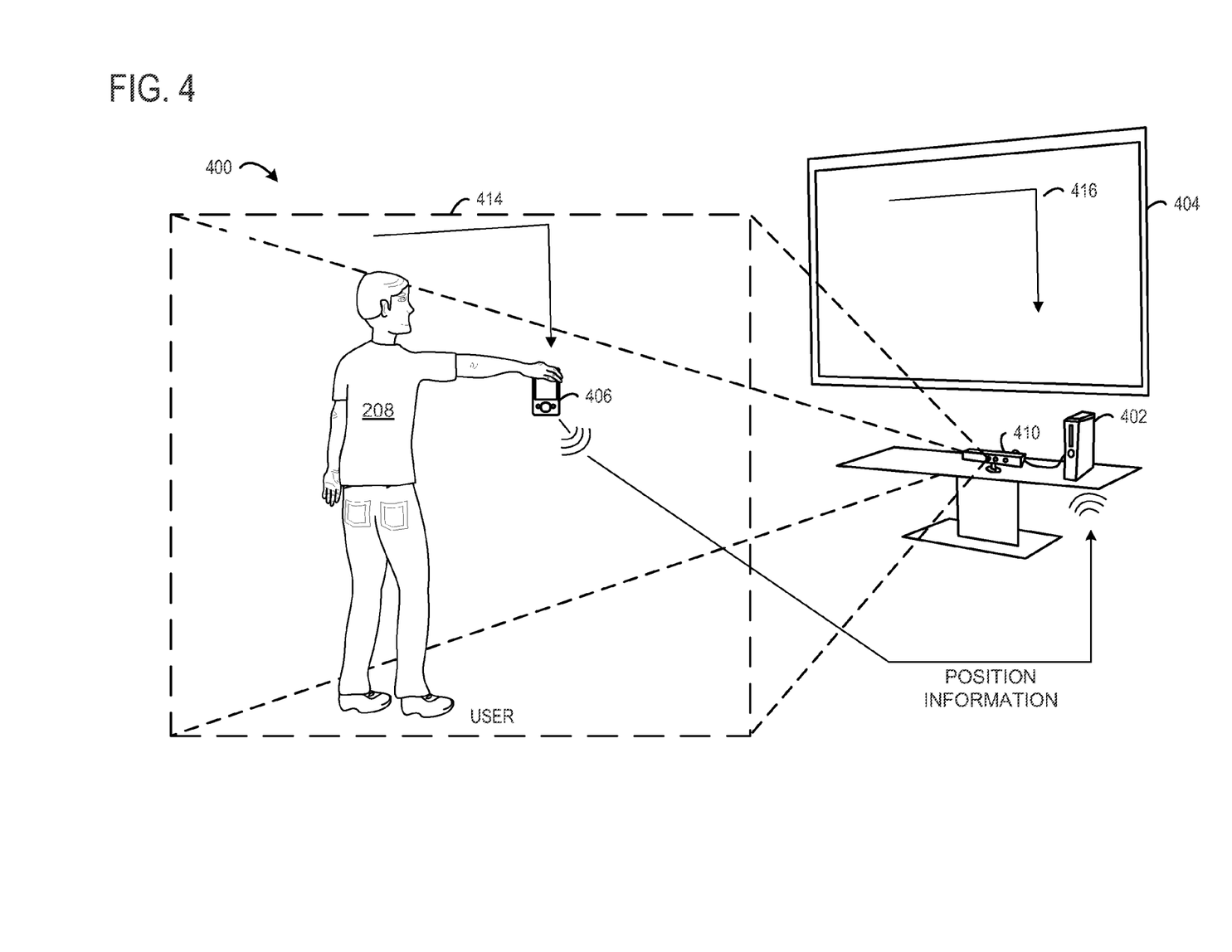
FIG. 4 shows an example secret sharing environment in accordance with an embodiment of the present disclosure.

FIG. 4 shows an example scenario illustrating an embodiment of method 100 of FIG. 1. In particular, FIG. 4 shows a nonlimiting example of a secret sharing environment 400 including a gaming system 402, a display device 404, a source 410, and a device 406. The display device 404 may be operatively connected to the gaming system 402 via a display output of the gaming system. For example, the gaming system may include an HDMI or other suitable display output. Likewise, the source 410 may be operatively connected to the gaming system 402 via one or more inputs. As a nonlimiting example, the gaming system 402 may include a universal serial bus to which a source, including a depth camera, may be connected. The device 406 and the gaming system 402 may be configured to wirelessly communicate with one another.

Gaming system 402 may be used to play a variety of different games, play one or more different media types, and/or control or manipulate non-game applications and/or operating systems. In the illustrated embodiment, display device 404 is a television, which may be used to present game visuals to game players and game observers. As one example, display device 404 may be used to visually present a path of the device 406 that is controlled by movements of a user 208.

In the illustrated embodiment, source 410 includes a depth camera capable of generating depth maps of scene 414, as described above with reference to FIG. 2. The depth maps may be analyzed to track a position of device 406.

A position of device 406 is controlled by movements of the user 208. The device 406 may include sensors for observing its own position. Further, device 406 may be configured to send position information via a wireless connection to the gaming system 402.

An exemplary process flow according to FIG. 4 is now described. For example, a user 208 may wish to gain access to a restricted resource which is controlled by the gaming system 402. To do so, the user 208 may trace the device 406 in a pattern. The pattern may be conceived 'on the fly' by the user, and need not be pre-defined. The source 410 may observe a scene 414, including motion of the user 208, and send video data representing such to the gaming system 402. Concurrently, the device 406 may observe and send position information representing its own path to the gaming system 402.

The gaming system 402 may receive the video data from the source 410, and the position information from the device 406. The gaming system 402 may interpret the video data sent from the source 410 to track an observed path of the device. Also, the gaming system 402 may interpret the position information sent from the device 406 to track a self-reported path of the device 406.

The gaming system 402 may compare the observed path to the self-reported path. If the observed path is within a threshold tolerance of the self-reported path, the gaming system 402 may provide access to a restricted resource, such as granting the device 406 permissions to remotely control the gaming system 402.

In some embodiments however, the user motion is not observed by the source 410. For example, the gaming system 402 may prompt the user to trace a certain pattern in order to gain access to the restricted resource. The gaming system may do such by displaying a pattern 416 on the display device 404. The user 208 may attempt to mimic the pattern 416 by tracing the device 406 in that pattern 416. The device 406 may observe and send position information representing its own path to the gaming system 402. The gaming system 402 may interpret the position information sent from the device 406 to track a self-reported path of the device 406. If the self-reported path is within a threshold tolerance of the pattern 416, the gaming system 402 may provide access to a restricted resource.

Figure 5:
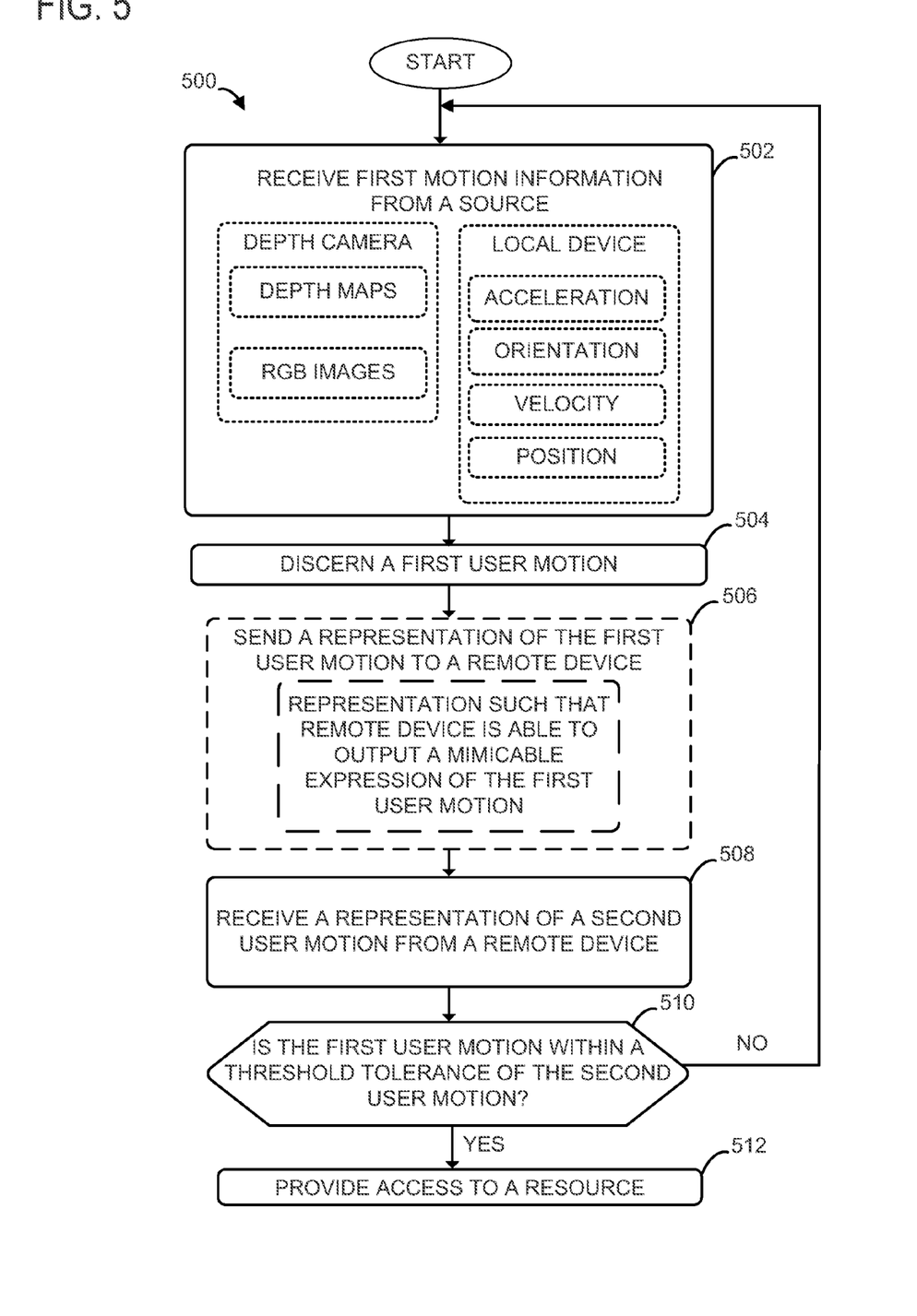
FIG. 5 shows another example method of interactive secret sharing in accordance with an embodiment of the present disclosure.

FIG. 5 shows an embodiment of a method 500 for sharing interactive secrets between entities. Method 500 may be performed by a computing system, including, but not limited to, an entertainment computing system such as a gaming console, or a mobile computing device.

At 502, the method 500 includes receiving first motion information from a source. The source may include any device capable of measuring motion information. For example, the source may include a depth camera or a conventional RGB camera, as explained above. As other examples, the source may include an accelerometer, a gyroscope, and/or other motion sensors capable of self-reporting motion information, as described above.

At 504, the method 500 includes discerning a first user motion from the first motion information. As described above, the motion information received from a source, whether an RGB camera, depth camera, and/or self-reporting device, may be analyzed to determine the movement of a user. As a first example, the virtual skeletons derived from depth camera observations may be analyzed from frame to frame to determine the movement of a user. The positions of a plurality of joints indicated by the sequence of virtual skeletons may be organized to provide a machine-readable representation of the first user motion. As another example, the self-measured position information measured by a device may be saved as a data structure that may be shared with other devices. In this way, first user motions such as dance moves, gestures, and the like may be characterized for later comparison and/or processing.

At 506, the method 500 may include sending a representation of the first user motion to a remote device. The representation of the first user motion may be sent via a network such as the Internet, or any other suitable communication channel. The representation of the first user motion may be configured so that the remote device is able to output a mimicable expression of the first user motion to a remote user. For example, if a first user traces their hand in the shape of a heart, an image of a heart may be sent to the remote device, and viewed by the remote user. Other representations of the first user motion could be sent, such as audio or video.

Because the representation of the first user motion is sent to the second device, the second device is able to provide the user of the second device with instructions for mimicking the motion. If the user attempts to mimic the motion, the second device (or another device) may collect motion information representing the attempt to mimic. For example, if the second device is a mobile device, the mobile device may self-measure its motion during the attempt. As another example, the second device may be observed by a depth camera.

At 508, the method 500 includes receiving a representation of a second user motion (e.g. 'the attempt') from the remote device. The representation of the second user motion may take the form of any representation that can be sent and received, such as an image, raw position information, a sequence of virtual skeletons, video data, etc. The representation of the second user motion may be sent via a network such as the Internet, or any other suitable communication channel.

At 510, the method 500 includes determining if the first user motion is within a threshold tolerance of the second user motion. This may be accomplished via any number of approaches. One approach may include representing both the first user and the second user as a virtual skeleton including a plurality of joints. Joint motions may be derived from the sequence of virtual skeletons and may be compared and processed to identify similarities in position, velocity, and acceleration, among other metrics. Other approaches may include representing each user motion as an image, and utilizing image comparison algorithms to determine if the first user motion is within a threshold tolerance of the second user motion. Still other approaches may compare the raw measurements of self-reporting devices.

At 512, if the first user motion is within a threshold tolerance of the second user motion, access to a restricted resource is provided, as described above. In addition to the nonlimiting examples provided above, providing access to a restricted resource may include providing a restricted communication channel (e.g. a chat room, a virtual game room, etc.) and/or providing access to a multi-player game session, for example.

In some embodiments of the method 500, step 506 may be omitted. For example, if two users in the same room want access to a restricted resource, a first user may perform a motion so that the second user may mimic the first user. Access to a restricted resource may be provided without sending a representation of the first user motion to a remote device, because the second user is able to see the first motion directly. As another example, access to a restricted resource, such as a multi-player game, may be provided responsive to two users moving in the same manner. As such, a game player wishing to start the multi-player game may perform the motion, and that game player can be matched with another game player (local or remote) that performs the same motion.

While motion serves as an example type of shared secret in the above examples, it is to be understood that other user expressions are equally within the scope of this disclosure. As a nonlimiting example, user sounds may serve as shared secrets. In some embodiments, a user may sing or say a phrase known to another user, and the other user may mimic and/or complete the phrase. The second user's phrase may then be compared to an expected phrase to determine if it is within a threshold tolerance of the expected phrase. If the phrase passes the test, access to a restricted resource may be provided.

In some embodiments, the above described methods and processes may be tied to a computing system including one or more computers. In particular, the methods and processes described herein may be implemented as a computer application, computer service, computer API, computer library, and/or other computer program product.

Figure 6:
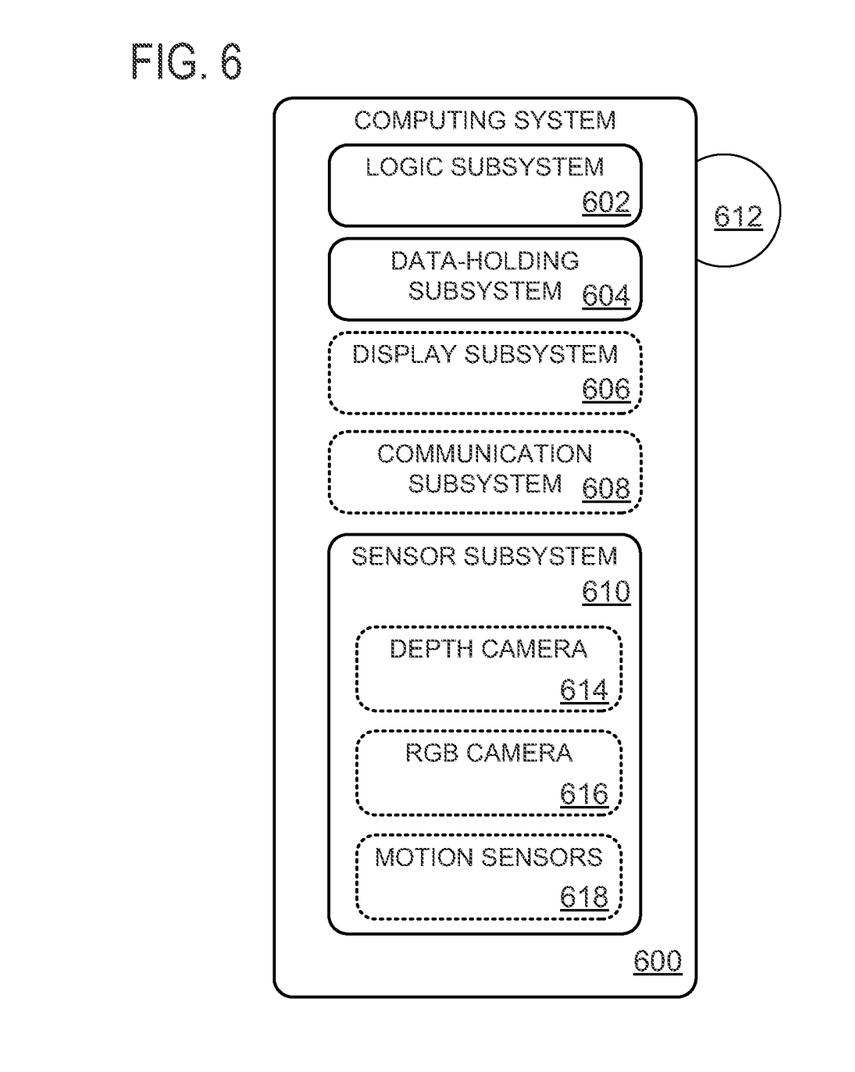
FIG. 6 schematically shows a computing system for performing the methods of FIGS. 1 and 5.

FIG. 6 schematically shows a nonlimiting computing system 600 that may perform one or more of the above described methods and processes. Computing system 600 is shown in simplified form. It is to be understood that virtually any computer architecture may be used without departing from the scope of this disclosure. In different embodiments, computing system 600 may take the form of a mainframe computer, server computer, desktop computer, laptop computer, tablet computer, home entertainment computer, network computing device, mobile computing device, mobile communication device, gaming device, etc. Gaming system 402 and device 406 are nonlimiting examples of computing system 600.

Computing system 600 includes a logic subsystem 602 and a data-holding subsystem 604. Computing system 600 may optionally include a display subsystem 606, communication subsystem 608, sensor subsystem 610, and/or other components not shown in FIG. 6. Computing system 600 may also optionally include user input devices such as keyboards, mice, game controllers, cameras, microphones, and/or touch screens, for example.

Logic subsystem 602 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 604 may include one or more physical, non-transitory, devices configured to hold data and/or instructions executable by the logic subsystem to implement the herein described methods and processes. When such methods and processes are implemented, the state of data-holding subsystem 604 may be transformed (e.g., to hold different data).

Data-holding subsystem 604 may include removable media and/or built-in devices. Data-holding subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 604 may include devices with one or more of the following characteristics: volatile, nonvolatile, dynamic, static, read/write, read-only, random access, sequential access, location addressable, file addressable, and content addressable. In some embodiments, logic subsystem 602 and data-holding subsystem 604 may be integrated into one or more common devices, such as an application specific integrated circuit or a system on a chip.

FIG. 6 also shows an aspect of the data-holding subsystem in the form of removable computer-readable storage media 612, which may be used to store and/or transfer data and/or instructions executable to implement the herein described methods and processes. Removable computer-readable storage media 612 may take the form of CDs, DVDs, HD-DVDs, Blu-Ray Discs, EEPROMs, and/or floppy disks, among others.

It is to be appreciated that data-holding subsystem 604 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 606 may be used to present a visual representation of data held by data-holding subsystem 604. As the herein described methods and processes change the data held by the data-holding subsystem, and thus transform the state of the data-holding subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or data-holding subsystem 604 in a shared enclosure, or such display devices may be peripheral display devices.

When included, communication subsystem 608 may be configured to communicatively couple computing system 600 with one or more other computing devices. Communication subsystem 608 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 600 to send and/or receive messages to and/or from other devices via a network such as the Internet.

In some embodiments, sensor subsystem 610 may include a depth camera 614. Depth camera 614 may include left and right cameras of a stereoscopic vision system, for example. Time-resolved images from both cameras may be registered to each other and combined to yield depth-resolved video.

In other embodiments, depth camera 614 may be a structured light depth camera configured to project a structured infrared illumination comprising numerous, discrete features (e.g., lines or dots). Depth camera 614 may be configured to image the structured illumination reflected from a scene onto which the structured illumination is projected. Based on the spacings between adjacent features in the various regions of the imaged scene, a depth map of the scene may be constructed.

In other embodiments, depth camera 614 may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernible from the relative amounts of light received in corresponding pixels of the two cameras.

In some embodiments, sensor subsystem 610 may include an RGB camera 616. Virtually any type of digital camera technology may be used without departing from the scope of this disclosure. As a nonlimiting example, RGB camera 616 may include a charge coupled device image sensor.

In some embodiments, sensor subsystem 610 may include motion sensor(s) 618. Example image sensors include, but are not limited to, accelerometers, gyroscopes, and global positioning systems.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data-holding subsystem holding instructions executable by a logic subsystem to:
   receive video data from a source;
   interpret the video data to track an observed path of a device;
   receive position information from the device;
   interpret the position information to track a self-reported path of the device; and
   if the observed path is within a threshold tolerance of the self-reported path, provide access to a restricted resource.

2. The data-holding subsystem of claim 1, where the source includes a depth camera.

3. The data-holding subsystem of claim 2, where the video data includes a sequence of depth maps, each depth map including a matrix of pixels, and each pixel including depth information indicating a depth of an object observed at that pixel.

4. The data-holding subsystem of claim 3, where interpreting the video data includes modeling a computer user as a virtual skeleton including a plurality of joints.

5. The data-holding subsystem of claim 4, where tracking the observed path of the device includes tracking an observed path of a hand joint of the virtual skeleton.

6. The data-holding subsystem of claim 1, where interpreting the video data includes recognizing the device.

7. The data-holding subsystem of claim 1, where the restricted resource is an electronic document.

8. The data-holding subsystem of claim 1, where providing access to the restricted resource includes allowing a user to log on to a multimedia console.

9. The data-holding subsystem of claim 1, where providing access to the restricted resource includes executing an application.

* * * * *